Figure 1:
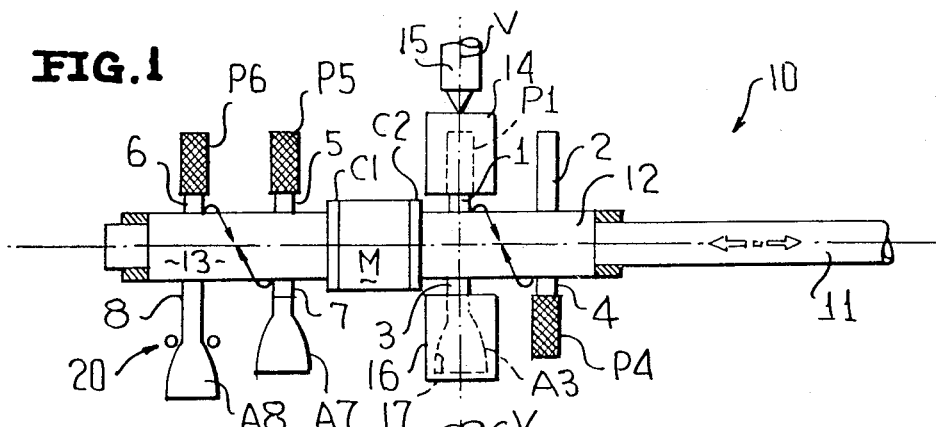

United States Patent [19]
Merz

[11] 3,797,983
[45] Mar. 19, 1974

[54] APPARATUS FOR INJECTION BLOW MOLDING PLASTIC ARTICLES
[75] Inventor: Edmund H. Merz, Palos Park, Ill.
[73] Assignee: Continental Can Company, Inc., New York, N.Y.
[22] Filed: Dec. 21, 1971
[21] Appl. No.: 210,334

[52] U.S. Cl....... 425/242 B, 264/97, 425/DIG. 209, 425/DIG. 211
[51] Int. Cl............................................ B29c 17/07
[58] Field of Search............ 264/94, 97, 98, 99, 89; 425/324 B, 326 B, 326 BJ, 387 B, 342, DIG. 209, 242 B, DIG. 211

[56] References Cited
UNITED STATES PATENTS
3,337,667   7/1967   Ninneman............................ 264/97
2,853,736   9/1958   Gussoni.......................... 264/97 UX Primary Examiner—Robert F. White
Assistant Examiner—J. H. Silbaugh
Attorney, Agent, or Firm—Diller, Brown, Ramik & Wight

[57] ABSTRACT

This disclosure relates to apparatus for molding plastic articles, such as bottles or jugs, by forming a plurality of parisons, expanding the parisons, and between the forming and expanding steps reciprocating and rotating at least one of the parisons to cool it during movement between forming and expanding stations at a rate which will maintain optimum overall cycle time whereby the degree of orientation retained in the blown article is greater than heretofore provided because of the extra cooling time involved. Preferably the apparatus includes a pair of supporting members, cores or blow sticks carried by the supporting members upon which the parisons are injected, and means for separately rotating each of the core supporting members to present each parison to a blow station with the pair of core supporting members being additionally reciprocated in a selective fashion to maintain optimum parison cooling and overall machine cycle time.

10 Claims, 8 Drawing Figures

APPARATUS FOR INJECTION BLOW MOLDING PLASTIC ARTICLES

It is well established that the colder a plastic parison is, the greater is the amount of orientation that can be retained in the blown article provided, of course, that the parison can be blown to specification and will not be fractured upon being blown. Present designs for injection blow molding machines link the injected parisons mechanically in such a way that if extra cooling time of the parison is desired, it can be obtained only at the sacrifice of overall cycle time. As an example, U.S. Pat. No. 2,853,736 in the name of Angelo Gussoni, issued Sept. 30, 1958, and entitled "Machine for the Manufacture of Bottles from Plastic Material," is typical of prior art machines in which a pair of parisons is injected at a first station, the parisons are transferred by rotation to a second station at which they are blown to a desired configuration and thereafter each blown article is ejected from the machine. It is well known that of these three steps, namely, injection, blowing and ejection, the fastest is the injection step, the slowest the blowing step, and the ejection being intermediate depending, of course, upon the eventual solidification of the material of the blown article. However, insofar as overall machine time is concerned, if one desires to cool the injected parison for let us assume a time period of 5 seconds, the overall machine cycle time would be heavily dependent upon the transfer time of 5 seconds between the injection of a parison and its eventual blowing at the succeeding station. Thus, discounting all other times for each machine cycle approximately 15 seconds would be necessary between the beginning of an injection operation and the ejection of a blown article since the time of an article at the blowing and ejection stations must be the same 5 seconds for the transfer of each parison from its injection to its blown condition.

In keeping with the foregoing, it is a primary object of this invention to provide a novel apparatus for carrying out a novel method of achieving cooler parisons for approximately the same amount of overall machine cycle time, as has been provided in the past, by means of both reciprocating and rotating the parisons between the injection thereof and the eventual blow molding into desired articles. In essence by using but a single injection head and a single blow cavity but a plurality of blow sticks, it is possible through the unique and novel system of rotation and reciprocation of this invention to assure a constant cooling period per parison between injection and blow molding thereof, while at the same time maintaining overall machine cycle time at an optimum.

A further object of this invention is to provide a novel apparatus which includes a pair of support members, the support members each carrying a plurality of blow sticks (or groups thereof), and means to selectively rotate the blow stick supporting members to achieve uniform parison cooling and optimum machine cycle time.

A further object of this invention is to provide a novel machine of the type described wherein but a single injecting means and blowing means are utilized with a pair of ejecting means to form blown articles as was heretofore noted.

With the above and other objects in view that will hereinafter appear, the nature of the invention will be more clearly understood by reference to the following detailed description, the appended claimed subject matter, and the several views illustrated in the accompanying drawings.

IN THE DRAWINGS:

FIGS. 1 through 8 collectively illustrate schematically each successive operative position of machine elements through one complete machine cycle.

A novel machine or apparatus for injection blow molding plastic articles, such as bottles, jugs or similar containers, is initially illustrated in FIG. 1 of the drawings, and is generally designated by the reference numeral 10. The machine 10 is illustrated schematically but includes a main shaft 11 which is preferably tubular and is suitably supported by a frame (not shown) at least at the right-hand end thereof, as viewed in this figure. The shaft 11 is tubular in order that conduits for supplying air under pressure from a source (not shown) may be coupled between appropriate valves (also not shown) exteriorly of the tubular support 11 and a plurality of blow sticks or cores 1 through 8. The blow sticks 1 through 4 are carried by a tubular sleeve 12 telescopically surrounding the shaft 11 while the blow sticks 5 through 8 are similarly carried by a tubular sleeve 13 telescopically surrounding the shaft 11. Conventionally coupled and carried by the shaft 11 is a motor M of the reversible one-half revolution type which operates through a pair of clutches C1, C2. The clutches C1, C2 are conventional magnetic clutches operated in response to solenoids or the like such that depending upon the programing of the machine the motor M is energized to rotate the sleeve member 13 one-half revolution (180°) clockwise or counterclockwise, or, again depending upon the particular programing of the machine 10, rotate the sleeve 12 through the clutch C2 clockwise or counterclockwise one-half revolution (180°). In addition, conventional reciprocating means, generally designated by the unnumbered headed arrows upon the right-hand end of the shaft 11 are provided to shift the sleeves 12, 13 in a reciprocal fashion in conjunction with the rotation thereof, as will be described immediately hereinafter relative to a complete description to one cycle of the operation of the machine 10.

A vertical plane V has been indicated in each of FIGS. 1 through 8 and common thereto is an injection or parison mold 14 associated with an injection nozzle 15 through which suitable polymeric or copolymeric material, such as polypropylene, polyethylene, etc., may be applied to the blow sticks 1 through 8 as parisons (P1 through P8). In this same plane is a blow mold 16 provided with an appropriate cavity 17 to the configuration of which each of the parisons is blown with the mold 16 preferably being of the two-piece type associated with typical blow molding machines. In this regard it is necessary only to note that the structures 14 through 16 are conventionally supported in alignment relative to the plane V, and either or both of the molds 14, 16 may be typical split molds which are opened and closed by conventional mechanisms (not shown) during the operation of the machine 10.

Figure 7:
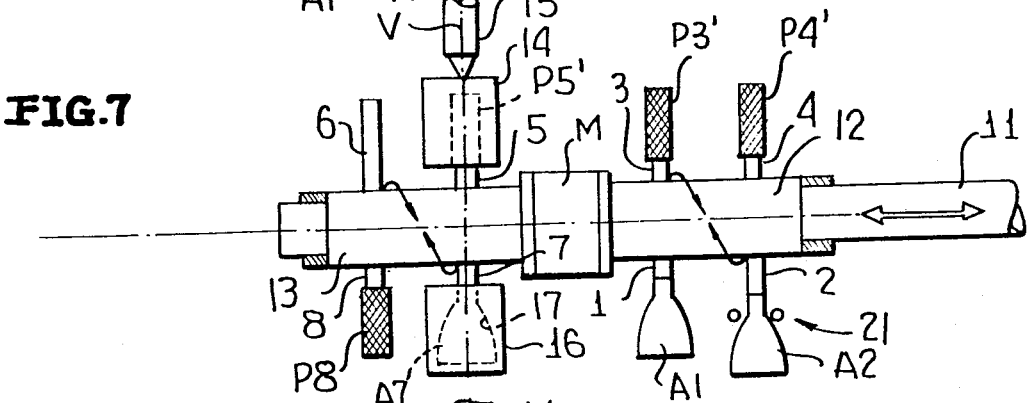

The injection mold 14 and the injection head 15 may be considered collectively to define an injection station, hereinafter referred to by the combined reference numerals 14, 15, whereas the blow mold 16 will be likewise considered as defining with ancillary structure a blow station 16. In addition, the machine 10 includes conventional ejection stations or means for ejecting blown articles from the blow sticks, the ejection means being generally designated by the reference numerals 20 (FIG. 1) and 21 (FIG. 7).

Though schematically indicated simply as a pair of fingers which can be suitably reciprocated vertically downwardly to strip each blow article from its associated blow stick, the ejection means 20, 21 could suitably simply be formed by appropriate valving which operates through the blow sticks to blow each article therefrom under pressurized air from the source (not shown) heretofore noted.

In describing one machine cycle of the machine 10, it will be assumed that parisons P4, P5 and P6 have been injected upon the respective blow sticks 4, 5 and 6, as illustrated in FIG. 1. Moreover, in FIG. 1 the cycle is shown beginning with blow stick 1 within parison mold 14 with the parison P1 being formed thereon. A previously formed parison is being blown in the blow mold 16 to form a blow molded article A3. At the same time, the previously blown article A8 upon blow stick 8 is being ejected by the ejection means 20.

Figure 2:
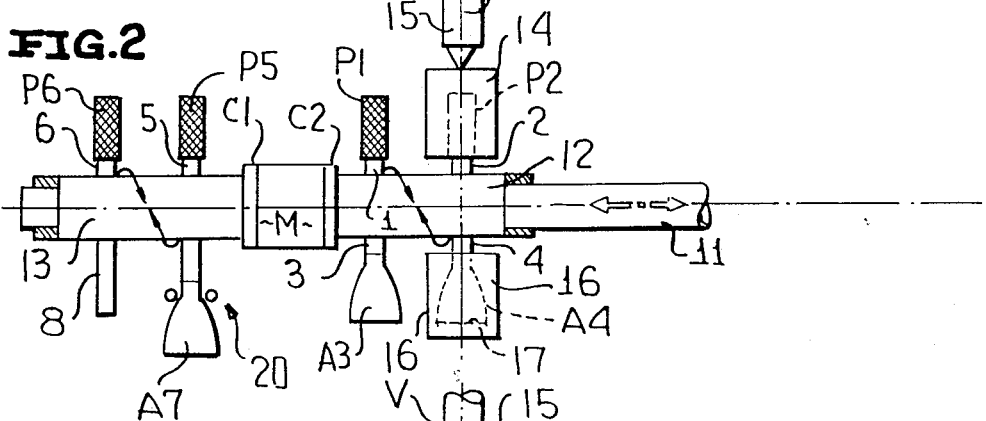

Turning now to FIG. 2 of the drawings, upon the forming of the parison P1, the forming of the article A3 and the ejection of the article A8 of FIG. 1, the molds 14, 16 are conventionally opened and the shaft 11 is reciprocated to the left bringing the blow sticks 2, 4 into alignment with the plane V, it being noted at this time that the previously formed parison P4 is in alignment with the mold 16 which closes thereabout as the mold 14 closes about the blow stick 2 for the subsequent injection thereupon of the parison P2. At the same time this leftward shifting of the shaft 11 brings the previously blown article A7 into alignment with the ejection means 20 for removal thereby. Upon the removal of the article A7, it will be noted that the blow sticks 7 and 8 are cleared while parisons P5, P6 are carried by the blow sticks 5, 6, respectively.

In response to a suitable program impulse or similar conventional control, the motor M is energized, as is the clutch C1, and the support 13 is rotated one-half revolution (180°) after the article A7 has been ejected to bring the blow sticks 7, 8 to a vertically upwardly directed position (FIG. 3) whereas the blow sticks 5, 6 are brought into a pendant position. Upon the opening of the split molds 14, 16, the shaft 11 is shifted to the right to the position shown in FIG. 3 bringing the blow stick 7 in alignment with the injection nozzle 15 and the injection mold 14 while the blow stick 5 carrying the parison P5 is brought into alignment with the blow mold 16. Upon the closing of the molds 14, 16 the parison P5 is formed into the article A5 by the injection of air thereinto through the blow stick 5 while a parison P7 is formed upon the blow stick 7. At this same time the ejection means 21 is operated to remove the article A4 from the blow stick 4 prior to the shifting of the shaft 11 once again to the right upon the opening of the molds 14, 16 to the position shown in FIG. 4.

Figure 4:
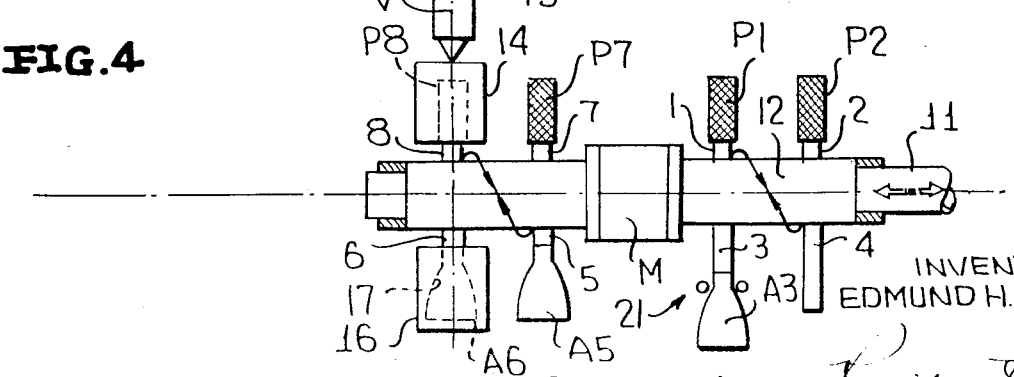

In the position of machine 10 shown in FIG. 4 the blow mold 16 is closed upon the parison P6 to form therefrom an article A6 whereas at the same time a parison P8 is formed upon the blow stick 8 within the injection cavity 14. During this same stage of the operation of the machine 10 the article A3 is ejected by the ejection means 21 whereupon the removal thereof it will be noted that the blow sticks 3, 4 are cleared whereas the blow sticks 1, 2 carry the parisons P1, P2, respectively.

After the ejection of the article A3 by the ejection means 21, the motor M is once again energized, as is the clutch C2 in this instance, to rotate the support 12 one-half revolution to bring the blow sticks 3, 4 to a vertically upwardly directed position with the blow sticks 1, 2 and the parisons P1, P2, respectively, carried thereby in a pendant position. Thereafter the molds 14, 16 are opened and the shaft 11 is shifted to the left to the position shown in FIG. 5.

Figure 5:
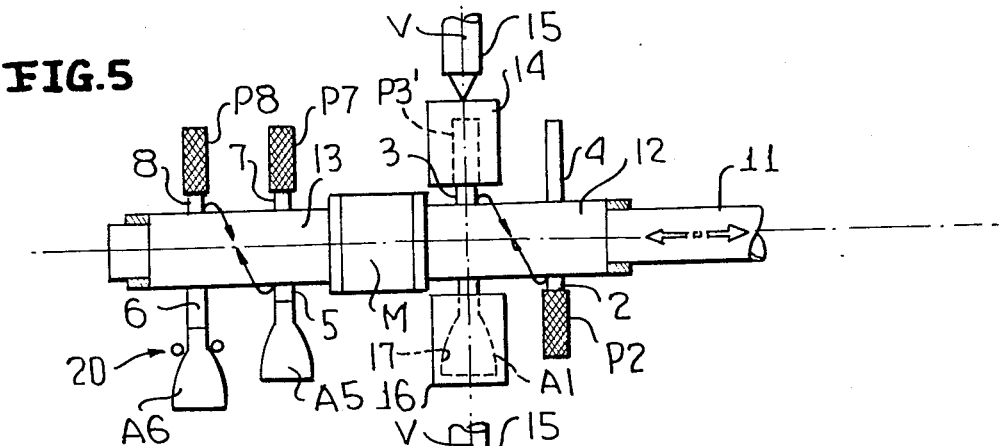
Figure 6:
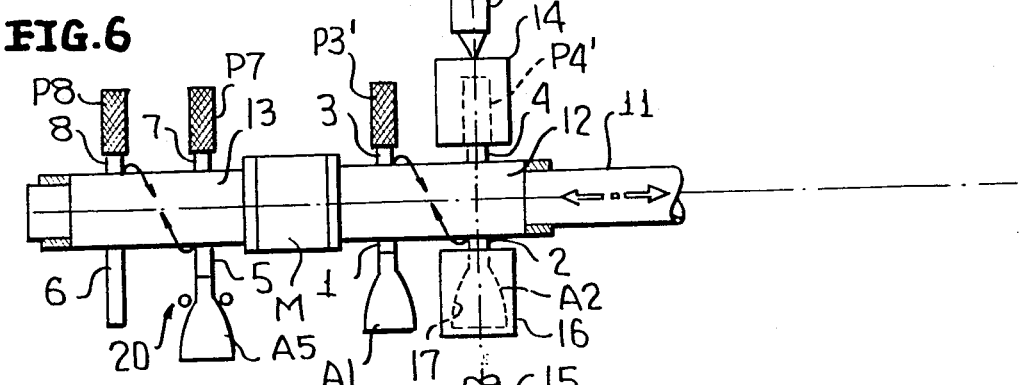

By comparing FIGS. 1 and 5, it will be noted that the latter is identical to the former except for the inversion or rotation of the blow sticks 1, 2, 5, 6 relative to the respective blow sticks 4, 3, 7, 8. In the position shown in FIG. 5, upon the closing of the molds 14, 16, the earlier formed parison P1 of FIG. 1 is formed to the article A1 while a new parison P3' is formed upon the blow stick 3. At the same time the article A6 formed from the parison P6 is ejected by the ejection means 20.

The shaft 11 is then shifted to the left upon the opening of the molds 14, 16 to bring the blow stick 2 with the parison P2 thereon in alignment with the blow mold 16 whereas the blow stick 4 is brought into alignment with the injection mold 14. A parison P4' is formed upon the blow stick 4 whereas the earlier formed parison P2 (FIG. 2) is formed into an article A2 by pressurized air emitted thereinto by the blow stick 2. At this same time, the ejection means 20 is operative to eject the article A5 from the blow stick 5 whereupon the blow sticks 5, 6 are clear whereas the blow sticks 7, 8 have parisons P7, P8 thereon. Upon the ejection of the blown article A5, the motor M and the clutch C1 are again energized to rotate the support 13 in an opposite direction as that originally rotated in FIG. 1, as is indicated by the oppositely directed unnumbered headed arrows in these two figures, to once again bring the blow sticks 5, 6 to a vertical position and the blow sticks 7, 8 to a pendant position (FIG. 7), after which upon the opening of the molds 14, 16 the shaft 11 is shifted to the right to bring the blow stick 5 in alignment with the injection mold 14 and the blow stick 7 in alignment with the blow mold 16 whereupon the parison P5' is formed upon the blow stick 5 and the previously formed parison P7 (FIG. 3) is formed into an article A7. At this same time, the article A2 is ejected by the ejection means 21.

Figure 8:
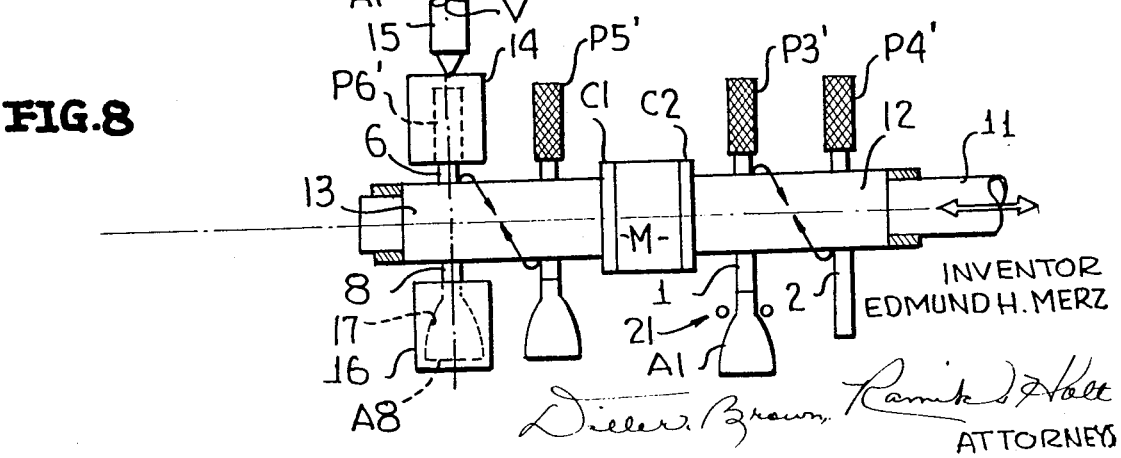

Upon the subsequent opening of the molds 14, 16, the shaft 11 is once again shifted to the right to the position shown in FIG. 8 at which the blow sticks 6, 8 are in alignment with and are subsequently closed by the respective split molds 14, 16. An article A8 is formed from the previously formed parison P8 (FIG. 4) while a parison P6' is formed upon the blow stick 6. The article A1 on the blow stick 1 is ejected and upon the subsequent opening of the molds 14, 16, the motor M is energized, as is the clutch C2, to rotate the blow stick support 12 to position the blow sticks 1, 2 in a vertically upright position while the blow sticks 3, 4 with the parisons P3' and P4' are in a pendant position. Upon the shifting of the shaft 11 to the left to the position of the machine 10 of FIG. 1, the cycle has been completed and the machine is now conditioned to permit the formation of another parison upon the block stick 1, as in FIG. 1, the blowing of an article from the parison P3', and the ejection of the article A8.

Figure 3:
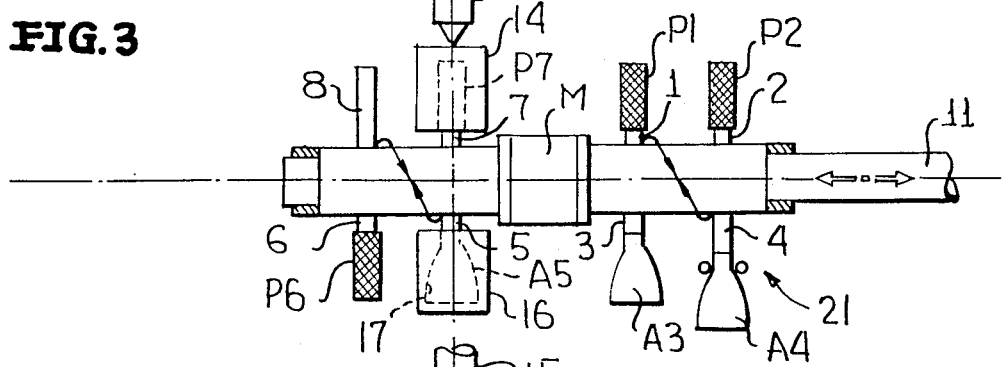

It is to be noted that each parison is rotated and reciprocated between its initial formation or injection and its subsequent blow molding into an article as, for example, the parison P1 being injected in FIG. 1 reciprocated to its FIG. 2 position, reciprocated to its FIG. 3 position, reciprocated to its FIG. 4 position, and subsequently being rotated to the position shown in FIG. 5 at which it is blow molded. Moreover, it is to be noted that with respect to the parison P1 and all other parisons, between the injection thereof (FIG. 1) and the blow molding thereof (FIG. 5) the parison P1 dwells in the stages of the machine shown in FIGS. 2, 3 and 4. In other words, each parison is subjected to three dwell times, as exemplified by the parison P1 of FIGS. 2, 3 and 4. Moreover, it is to be noted that rotation occurs only at such time as two blow sticks have parisons thereon while the opposite two blow sticks of the same blow stick support are devoid of blow molded articles, as exemplified by the initial transition illustrated in FIGS. 2 and 3 whereat, as heretofore noted, the blow stick support 13 is rotated only after the article A7 has been ejected therefrom by the ejection means 20.

It is also to be noted that though the blow sticks 1 through 8 have been described as being simply singular blow sticks, there could in accordance with this invention be substituted a group of blow sticks for each individual blow stick illustrated. For example, if the blow sticks 1 through 8 were substituted for by three blow sticks at each position, there would be eight groups of three blow sticks or a total of 24 blow sticks requiring the addition of two additional injection molds 14 (for a total of three), two additional blow molds 16 (also for a total of three), and two additional ejection means at each station 20, 21. However, even in this case the machine would both rotate and reciprocate during the transition of any group of parisons from the formation thereof at the injection stations to the subsequent blow molding thereof at the blow molding stations.

While preferred forms and arrangements of parts have been shown in illustrating the invention, it is to be clearly understood that various changes in details and arrangement of parts may be made without departing from the spirit and scope of this disclosure.

I claim:

1. Apparatus for molding articles comprising an injection station and a blow station, a plurality of cores, means for supporting said cores for movement between the injection and blow stations, said cores being spaced a predetermined distance from each other along an axis of said supporting means, said supporting means axis being disposed between said injection and blow stations, said supporting means being adapted for movement along and about said axis, means for injecting a parison upon a first core at said injection station, means for moving said supporting means along its axis at least said predetermined distance to bring a second core to said injection station, means for at least rotating said supporting means about its axis to bring said first core to said blow station, and means for blowing the parison upon the first core at said blow station to form an article therefrom with a dwell cycle being established by said movement of said cores which has a time period equal to at least twice the injection time.

2. The apparatus as defined in claim 1 including means for maintaining another plurality of parisons non-rotatably stationary while said first core is rotated by said rotating means.

3. The apparatus as defined in claim 1 wherein said rotating means is operative to rotate formed parisons at least in pairs.

4. The apparatus as defined in claim 1 wherein said supporting means is defined by at least a pair of core supporting members, at least a pair of cores carried by each supporting member, and means for separately rotating each of said core supporting members.

5. The apparatus as defined in claim 4 including means for maintaining at least one of said core supporting members non-rotatably stationary while the other core supporting member is rotated.

6. The apparatus as defined in claim 1 wherein said moving means further moves said supporting means along its axis said same predetermined distance but in an opposite direction thereto.

7. The apparatus as defined in claim 6 including means for maintaining at least another plurality of parisons non-rotably stationary while said last-mentioned parisons are rotated.

8. The apparatus as defined in claim 6 wherein said rotating means is operative to rotate formed parisons at least in pairs.

9. The apparatus as defined in claim 6 wherein said reciprocating and rotating means are defined by at least a pair of core supporting members, at least a pair of cores carried by each supporting member, and means for separately rotating each of said core supporting members.

10. The apparatus as defined in claim 6 including means for maintaining at least one of said core supporting members non-rotatably stationary while the other core supporting member is rotated.

* * * * *